Oct. 13, 1942.                     C. V. SMITH                     2,298,429
       METHOD AND APPARATUS FOR AUTOMATIC PRESSURE CONTROL
              IN MOLDING OF SYNTHETIC RESINOUS MATERIAL
                         Filed Aug. 23, 1940

INVENTOR
CHARLES V. SMITH
BY
ATTORNEYS

Patented Oct. 13, 1942

2,298,429

UNITED STATES PATENT OFFICE 2,298,429

METHOD AND APPARATUS FOR AUTOMATIC PRESSURE CONTROL IN MOLDING OF SYNTHETIC RESINOUS MATERIALS

Charles V. Smith, Dayton, Ohio, assignor to The Univis Lens Company, Dayton, Ohio, a corporation of Ohio Application August 23, 1940, Serial No. 353,929

6 Claims. (Cl. 18—17)

This invention relates to a method and apparatus for producing a lens from a blank of synthetic resinous material, and more particularly to the production of a lens under automatically controlled pressure conditions.

There have heretofore been various attempts made to produce optically true lenses from unbreakable materials such as synthetic resins, some of which have been by a partially automatic process. However, the former attempts at automatic control of the forming process for a lens made from a synthetic resinous material have not been entirely satisfactory since neither the method nor the apparatus considered automatic control over the rate of formation of a blank of resinous material.

There are many resinous materials which may be used in forming lenses, however, those which are more commonly used are known to the trade by the name plexiglas, lucite, crystallite, and others which are the polymerized derivatives of acrylic or methacrylic acids. These particular resins have shown certain desirable properties for use in connection with the production of unbreakable lenses in that these materials have a favorable index of refraction for optical purposes, are crystal clear and transmit practically all light rays.

The usual procedure, heretofore followed, in producing lenses from a blank of synthetic resinous material has been to place a blank of proper dimension and thickness between the die surfaces which have been pre-finished to the proper optical curvature desired to be obtained upon a finished lens. The die elements were then heated and brought into engagement either during heating or upon proper temperature elevation into engagement with the blank of resinous material to elevate the same in temperature. Pressure was then applied upon the dies to alter the physical shape of the lens blank to conform with the optical curvature of the surfaces provided upon the die elements.

The die elements were cooled while pressure was retained upon the formed resinous blank, whereby the blank was set in its altered condition. Upon completion of the formation, it was assumed that a perfect lens had been created since the optical curvature of the surfaces of the die elements had been imparted to the lens blank. However, these former methods did not produce satisfactory lenses, since I have found that these former methods did not take into account various "optical strains" set up within the lens blank during the forming operation. The term "optical strains" refers to those strains sets up in a resinous material, or blank of resinous material, caused by the deformation of the blank which displaces the optical paths in the material. These former lenses have resulted in a lens having more than a single index of refraction, creating birefringence, and resulting in fuzziness of an object viewed through the lens.

I have also found that if a lens is formed in a manner that the "optical strain" is held to an allowable minimum that the physical properties of the synthetic resin are unimpaired since the lens will not have undue mechanical stress frozen into the lens when set, which stresses are caused by the alteration of the shape of the lens blank. Such detrimental effects as loss of hardness, loss of resistance to chemical attack and undue fragility are not encountered.

Further, I have found that these former methods did not take into account the relation of rate of pressure application with regard rate of temperature increase, hence, it is an object of this invention to provide a method for forming a blank of resinous material into a lens whereby the rate of pressure application for forming the lens is determined by the increase of temperature of the lens blank.

Another object of the invention is to provide a method for forming a blank of resinous material into a lens in a manner that the rate of pressure application for forming the lens is automatically controlled, and is responsive to an increase in temperature of the lens blank.

Another object of the invention is to provide a method for forming a resinous lens blank into a lens, whereby the formation of the lens may be started when cold and the pressure of application for forming the same be gradually increased as the temperature of the blank increases.

Another object of the invention is to provide a method for forming a resinous lens blank into a lens wherein the forming operation can be initiated while the lens blank is cold and wherein the rate of pressure application upon the lens blank while cold is automatically regulated at a relatively low rate and slowly increasing rate, which pressure application, as well as the rate of increase of pressure application, rises with a temperature rise of the resinous blank.

Another object of the invention is to provide a toggle mechanism for controlling the rate of pressure application upon a resinous lens blank during the formation thereof.

Another object of the invention is to provide a toggle mechanism for controlling the rate of pressure application upon a lens blank, which toggle mechanism has a constant source of power for gradually increasing the rate of pressure application, as well as pressure applied, upon a temperature increase of the resinous lens blank, and in accordance therewith.

A still further object of the invention is to provide a method for forming a blank of resinous material at a rate proportionate to the rate of increase of temperature of the lens blank.

Another object of the invention is to provide a pressing apparatus wherein the pressing die is motivated by means of a toggle mechanism, which mechanism is provided with a constant power source and which increases the pressing pressure in accordance with the temperature increase of a resinous blank being formed thereby.

Further objects and advantages will be apparent from the following description and drawing.

Figure 1:
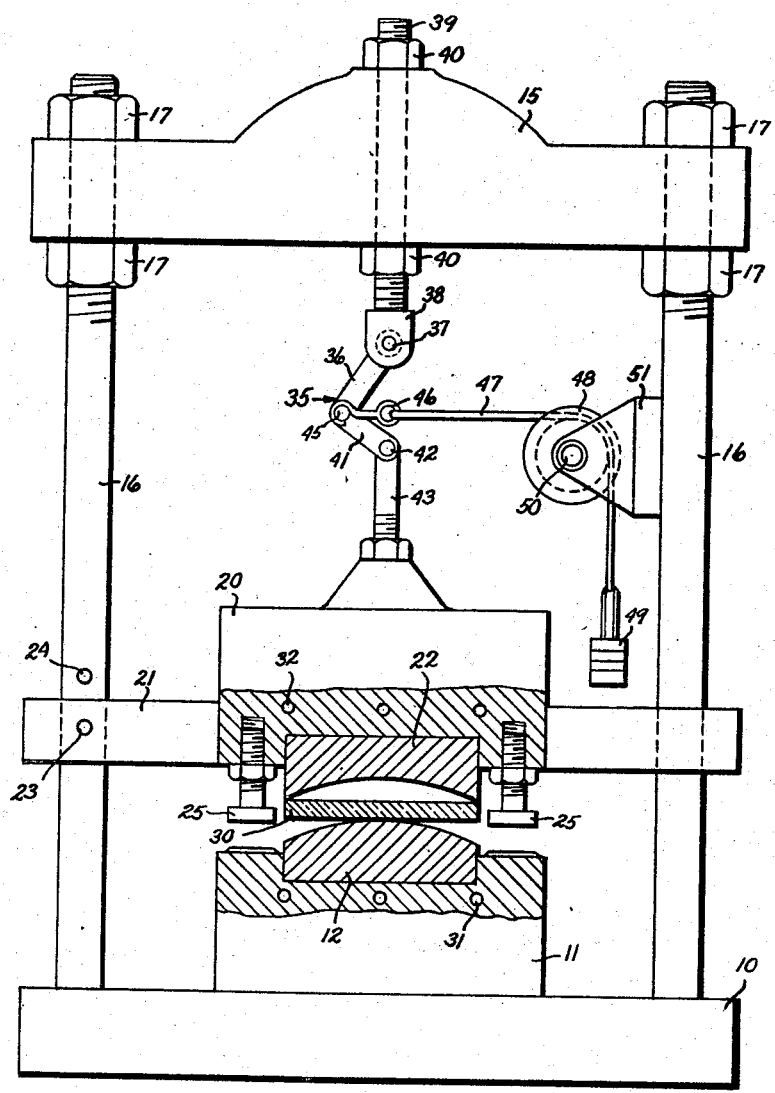
Figure 1 is an elevational view of a press for forming lens blanks, the die elements being shown in cross section.

In this invention I propose to produce a lens from a synthetic resinous material which will be substantially free of optical strain, and particularly will be free of optical strain of a value which impairs the optical properties of the material.

The general problem of lens formation should first be considered to determine the problem which is solved by this invention. The general procedure in forming a lens from a blank of resinous material consists of positioning a lens blank between die elements having surfaces thereon of the proper optical curvature. These die elements are then heated, elevating the temperature of the lens blank to within a working temperature range. Pressure is then applied upon the die elements to compress the lens blank and to alter its physical configuration. Subsequently the die is cooled, and upon removal of the lens blank it has been assumed that a perfect lens has been created.

I have found, however, that during the formation of lenses by the previous methods the specific rates of formation, according to the temperature at which the material was worked, were not taken into consideration and as a result, the lenses were imperfect due to the fact the material had been moved at too rapid a rate causing the production of optical strain and resulting in bi-refringence.

To produce a lens which is substantially free from optical strain of sufficient value to displace the optical paths through the material, the rate at which the material is moved during formation determines the total optical strain formed in the lens. I have determined that there is a definite rate at which a resinous material can be deformed according to the temperature at which the material is being worked, beyond which rate of deformation optical strain is produced of sufficient value to impair the optical properties of the lens. In general, the rate at which the deformation can take place increases with an increasing temperature. While it has been possible to make satisfactory lenses by a manual control, holding the temperature of the resin constant, and knowing the rate at which the resin can be deformed, yet it has not been practical to produce a lens from a blank of resinous material by a completely automatic process, and particularly one in which the rate of deformation is increased substantially with the permissible increase in rate of deformation allowed by a temperature rise of the resinous blank.

In this invention, the apparatus for practicing the invention consists of a press having a bed 10 upon which a mold carrying member 11 is positioned, which is adapted to carry a die member 12. A cross head 15 is supported upon upwardly extending rods 16 and is stationarily positioned with regard to bed 10 by means of the bolts 17. A mold carrying member 20 is mounted upon a horizontally positioned guide member 21 which straddles the supporting posts 16 for guiding the mold carrying member 20 in its vertical travel. The mold carrying member 20 carries a die member 22 and is supported in its normally upward position by means of a pin which may extend through the holes 23 and 24 provided in the guide member 21 and the post 16 respectively. Adjustable stop members 25 may be provided in the mold carrying member 20 and control the spaced relationship of the die members 12 and 22 when in closed position, thereby controlling the final thickness of a lens blank 30 positioned therebetween. Suitable passages 31 are provided in the mold carrying member 11, and suitable passages 32 are provided in the mold carrying member 20 for the circulation of a heating or cooling fluid.

The operating mechanism for the mold carrying member 20, for causing compression movement thereof, consists of a toggle 35. The toggle 35 consists of a link 36 pivotally mounted upon a pin 37, which in turn is mounted within a yoke member 38. The yoke member 38 is secured to the end of a threaded rod 39 which extends through the cross head 15 and is provided with bolts 40 on either side of the cross head 15 to position the yoke 38 in a vertical position. The toggle 35 also consists of a link 41 which is pivotally mounted by means of a pin 42 upon a rod 43 extending from the mold carrying member 20.

The links 41 and 36, comprising the toggle 35, are pivotally connected together by means of a pin 45. A hook member 46 extends around the pin 45 and is provided with a loop in one end thereof through which a flexible cable 47 extends. The flexible cable 47 passes over a pulley 48 and has a weight 49 suspended from the end thereof. The pulley 48 is rotatably mounted upon an axle 50 and is carried by a bracket 51 suitably secured to the support rod 16. The action of the toggle 35 is similar in all respects to the usual power increase obtained when using the toggles for power strokes. The conventional toggle mechanism is arranged so that one link thereof is rigidly supported, while the opposite link moves a device which meets resistance, and wherein a force is applied at right angles to the central line of the toggle. The force exerted by the toggle is relatively weak during the initial progress of its stroke, while the force increases rapidly through the final progress of its stroke. Thus, when a force, such as the weight 49, which is of known value, is applied by means of the flexible cable 47 to the pin 45, the toggle is caused to move forward in a straight line, whereby straightening of the links 36 and 41 moves the mold carrying member downwardly through a pressing operation. As the angle of the toggle decreases, the force applied by the toggle increases until the links 36 and 41 are in a straight line.

Figure 2:
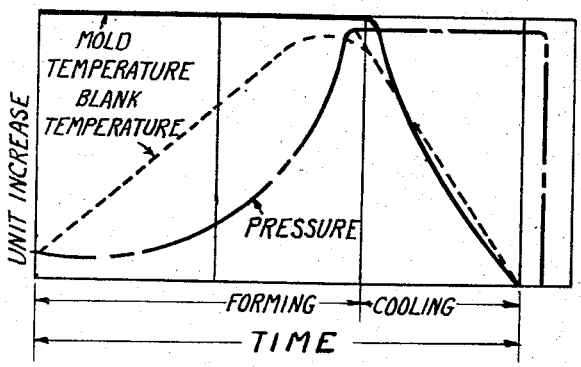
Figure 2 is a curve chart representing the various increases of pressures and temperature and their interrelated relationship.

In using the toggle for applying forming pressure upon the resinous lens blank 30, positioned between the die members 12 and 22, the pressure applied upon the lens blank 30 can be automatically regulated to increase as the temperature of the blank increases. Since the weight 49 is of a known value, and since the links 36 and 41 of the toggle 35 are of a known value, a definite rate of pressure increase can be plotted on a curve for the toggle 35. This curve is represented by the broken line of Figure 2, which represents that the pressure applied by the toggle begins with a low value and increases slowly in value as the toggle moves toward a straight line, and that the rate of increase of the pressure is more rapid at the end of the stroke of the toggle than at the beginning. The relation of this rate of increase with regard the increase in temperature of the lens blank formed within the die will be hereinafter more specifically pointed out.

To form a lens from a blank of resinous material, the mold carrying members 20 and 11 are opened to permit the insertion of a blank of resinous maerial between the die members 12 and 22. The die members 12 and 22 have provided thereon, surfaces which are of the proper optical curvature to produce a lens. These dies may be either metal or glass or a material which will produce an extremely accurate finished curvature and a highly polished surface upon the lens blank. The die member 22 is then closed upon the blank 30 to retain the same between the member 22 and the die member 12, whereby thermal contact is made between the die elements and the blank 30 for elevating the temperature of the blank. Heating fluid may be continually circulated through the mold carrying members 20 and 11 during a plurality of cycles of operation, or the molds may be started from a cold condition and heat the lens blank from room temperature to its maximum forming temperature. There will be no difference in the operation of the device if the cycle of operation is started with the molds at maximum molding temperature or at room temperature, the only difference being the time involved for the cycle.

When the die 22 is closed upon the blank 30, the temperature of the blank begins to rise. Simultaneously, with closing of the die 22, pressure is applied thereto by means of the weight 49 transmitting pressure through the toggle 35. However, since the toggle 35 is at its maximum angularity, the pressure applied by the weight 49 will be small, this pressure having been pre-calculated to be the pressure of formation for the lens blank which would not result in the production of optical strain due to formation of the blank at an improper rate at the temperature the blank starts its cycle of formation. As the temperature of the blank increases, the resistance thereof becomes less, whereby the toggle 35 is caused to move toward a straight line by means of the weight 49, whereby the pressure applied by the toggle upon the lens blank 30 is increased upon each successive temperature rise of the lens blank 30. The toggle 35 will apply a definite increase of pressure upon the mold at any specific position thereof. The rate at which the toggle applies pressure during the early portion of its stroke is a slowly increasing rate, characteristic of toggle actions. This rate of pressure increase conforms with the rate of pressure of formation which can be applied to a lens blank when in the lower temperature ranges, since during the early stages of temperature elevation of the lens blank, the rate of formation cannot be as rapid as during the latter stages when the temperature has reached the approximate peak of formation temperature.

The characteristic action of the toggle 35 is such that as the resistance of the lens blank is reduced by the increasing temperature thereof, the toggle increases the pressure applied to the lens blank, and also increases the rate at which the pressure is applied. As the temperature of the lens blank increases toward maximum forming temperature, the permissible rate of deformation increases, and the characteristic action of the toggle 35 is such that its rate of pressure application increases near the end of its stroke, so that the permissible rate of deformation of the lens blank and the actual rate of formation thereof increases at substantially the same time.

It is thus seen that a toggle having a known force applied thereto can be arranged in such a manner that the rate of forming pressure applied by the toggle will be in accordance with the permissible rate of deformation of the lens blank due to its temperature increase, whereby a completely automatic apparatus is provided wherein the rate of formation follows the permissible rate of deformation without danger of developing optical strain by moving the material at any time at a rate greater than the permissible rate of deformation. It is also seen that since the rate of formation follows the permissible rate of deformation, which permissible rate is reflected by the temperature increase of the blank, that the lens will be completely formed or substantially completely formed when the temperature of the blank reaches a pre-determined maximum forming temperature.

The stop members 25 limit the movement of the die 22 with respect the die 12 whereby the thickness of the lens blank 30 is pre-determined, and limits the final compression of the lens blank during the formation period. Subsequent to the formation period, the lens blank may be cooled by circulating cooling fluid through the passages 31 and 32, while retaining maximum forming pressure until the lens blank is set.

While the toggle of the apparatus shown and described herein has not been described as a specific toggle for obtaining a specific rate of pressure increase thereby, it may readily be understood, from the usual characteristics of toggle mechanisms, that the toggle can be properly designed to produce a curve having the desired increase of pressure, as well as a desired rate of increase. Either the weight 49 which provides a power source of known value, or the toggle itself may be adjusted to vary the characteristic pressure curve of the toggle.

While the form and embodiment as disclosed and described is a preferred form, yet I do not wish to be limited to a specific apparatus, since the apparatus may vary considerably in structure without departing from the inventive teaching herein.

Also, I wish it to be understood that while the description of the specification has used the terminology of a lens with respect the description of the process, I do not wish to be limited to a lens form. The method of altering the shape of a blank of resinous material is just as applicable to the production of an optical plano. The optical strain produced in forming a lens or a plano is as destructive in its effects to one as the other, hence, the method of this invention is applicable to the production of optically true planos, as well as lenses.

Having thus fully described my invention, what I claim as new and desire to secure by Letters Patent, is:

1. A method of producing a lens from a blank of resinous material which consists of placing a blank of resinous material on one part of a two-part heated mold, applying the other part of the mold to said blank, establishing a force of constant magnitude, elevating the temperature of said blank while in said mold to render the blank plastic whereby said blank is shaped between said mold parts, and so applying said force of constant magnitude to one of said mold parts that the pressure on the blank gradually increases as the blank becomes more and more plastic, stopping the movement of said last named part at a definite point according to the thickness desired in the finished blank, and thereafter cooling the blank to set the same.

2. A method of producing a lens from a blank of resinous material which consists of placing a blank of resinous material on one part of a two-part heated mold, applying the other part of the mold to said blank, establishing a force of constant magnitude, elevating the temperature of said blank while in said mold to render the blank plastic whereby said blank is shaped between said mold parts, applying said force of constant magnitude to one of said mold parts through means of a toggle system so that the pressure on the blank gradually increases as the blank becomes more and more plastic, stopping the movement of said last named part at a definite point according to the thickness desired in the finished blank, and thereafter cooling the blank to set the same.

3. A method of producing a lens from a blank of resinous material which consists of placing a blank of resinous material on one part of a two-part heated mold, applying the other part of the mold to said blank, establishing a force of constant magnitude, elevating the temperature of said blank while in said mold to render the blank plastic whereby said blank is shaped between said mold parts, applying said force of constant magnitude to one of said mold parts through means of a toggle system so that the pressure on the blank gradually increases as the blank becomes more and more plastic, stopping the movement of said last named part at a definite point according to the thickness desired in the finished blank, and thereafter cooling the blank to set the same.

4. An apparatus for producing a lens from a blank of resinous material, comprising a two-part heated mold, one part of which is adapted to receive said blank, means for applying the other part of the mold to said blank, means for elevating the temperature of said blank while in said mold to render said blank plastic whereby said blank is shaped between said mold parts, said part applying means including means for establishing a constant force and means cooperating with said last mentioned means for gradually increasing the pressure on the blank as the same becomes more and more plastic, and means for stopping the movement of said other part at a definite point according to the thickness desired in the finished blank.

5. An apparatus for producing a lens from a blank of resinous material, comprising a two part heated mold, one part of which is adapted to receive said blank, means for applying the other part of the mold to said blank, means for elevating the temperature of said blank while in said mold to enter said blank plastic whereby said blank is shaped between said mold parts, said part applying means including a means for establishing a constant force and a toggle system cooperating with said last mentioned means for gradually increasing the pressure on the blank as the same becomes more and more plastic, and means for stopping the movement of said other part at a definite point according to the thickness desired in the finished blank.

6. An apparatus for producing a lens from a blank of resinous material, comprising a two-part heated mold, one part of which is adapted to receive said blank, means for applying the other part of the mold to said blank, means for elevating the temperature of said blank while in said mold to render said blank plastic whereby said blank is shaped between said mold parts, said part applying means including means for establishing a constant force and a toggle system cooperating with said last mentioned means for gradually increasing the pressure on the blank as the same becomes more and more plastic, and means for stopping the movement of said other part at a definite point according to the thickness desired in the finished blank, said means for establishing a constant force comprising a weight and means connecting said weight to said toggle system.

CHARLES V. SMITH.